Figure 1:
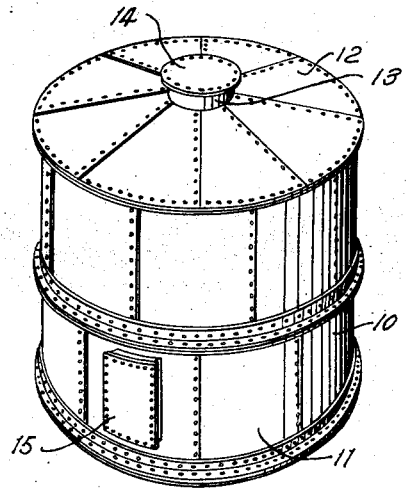

Nov. 24, 1959

J. P. WALKER 2,914,149

SEALING STRUCTURES

Filed May 21, 1953

2 Sheets-Sheet 1

INVENTOR
Jay P. Walker

BY *Ashley & Ashley*

ATTORNEYS

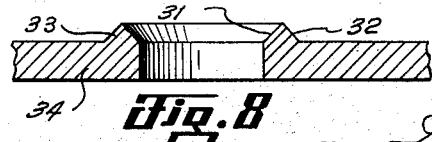
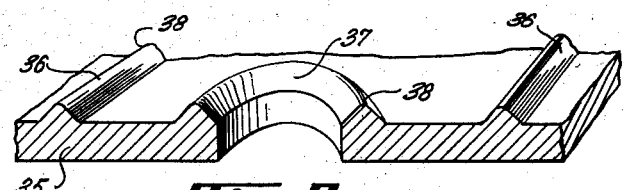
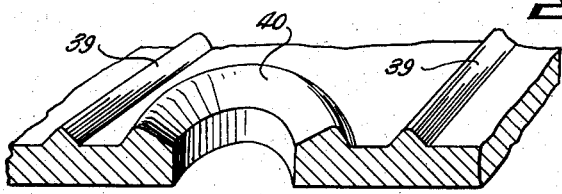
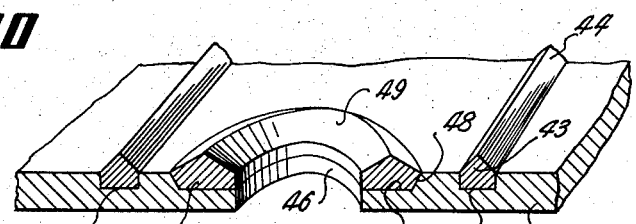
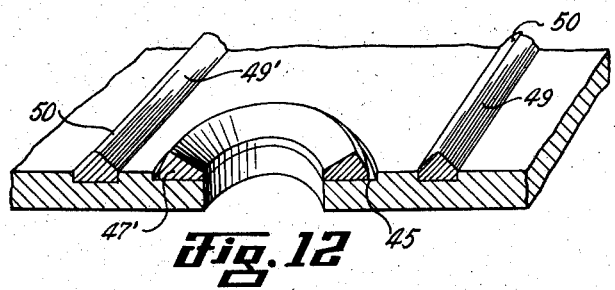
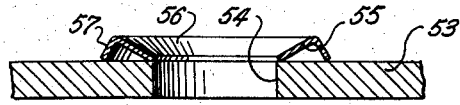
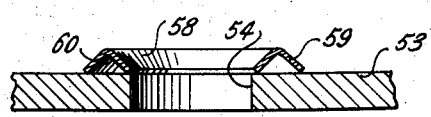
INVENTOR.
Jay P. Walker

Patent 2,914,149 — Nov. 24, 1959

2,914,149
SEALING STRUCTURES

Jay P. Walker, Tulsa, Okla., assignor to National Tank Company, Tulsa, Okla., a corporation of Nevada Application May 21, 1953, Serial No. 356,395

8 Claims. (Cl. 189—36)

This invention relates to new and useful improvements in sealing structures.

The invention is particularly applicable to the sealing of joints occurring in the walls of bolted tanks and similar containers, but is readily applicable to ther structures in which two flanges, plates, or other plate-like elements are to be joined in overlapping and adjoining relationship by means of bolts or other fastening means extending through the overlapping edges of the elements, and in which it is desired to secure a tight joint between the elements.

Because of its nature, the invention is primarily adapted for use in structures formed of synthetic resin or other readily moldable or formable material, but the invention is not limited to such use. As one important application of the invention, the same will be described in conjunction with its use in a bolted tank, as employed in the petroleum industry for the storage of water, petroleum fluids, and other materials. Such description and illustration, however, is for the purposes of convenience and is not to be construed as limiting the invention to such use.

In the petroleum industry, very corrosive fluids such as salt water, corrosive petroleums and gases containing hydrogen sulphide or other corrosive agents, create a considerable problem in that metallic tanks and similar structures which come in contact with these fluids are rapidly destroyed or rendered unusable through the corrosive action of such fluids. The construction of tanks from synthetic resins constitutes one solution to this problem, and the present invention is particularly adaptable to sealing the bolted joints of such synthetic resin or plastic tanks.

The adequate sealing of the bolted joints in oil field and other types of bolted tanks has long posed a difficult problem, and many efforts have been made to provide a satisfactory and efficient sealing arrangement for these bolted joints. Fluids within the tank tend not only to leak from between the abutting edges of the plates forming the side walls and bottom of the tank, but they also tend to leak along the threads of the bolts which extend through the side walls and bottom of the tank. Various types of supplemental gaskets and washers have been employed for preventing such leakage, but these arrangements necessarily involve additional pieces and parts for the tank structure, which are subject to loss or incorrect installation, or even unintentional omission from the tank. Further, such arrangements do not always provide a satisfactory answer to the problem at hand.

It is therefore, one object of this invention to provide an improved sealing structure for joints between overlapping plate-like members in which a sealing gasket is positioned between the adjacent faces of the members and an effective seal obtained so as to prevent the leakage of fluids through the joint thus formed.

Another object of the invention is to provide an improved device of the character described in which a complete and reliable seal is obtained between the adjacent faces of the plate-like members.

A still further operation of the invention is to provide an improved device of the character described in which the gasket member is caused to flow toward the bolt or other fastening device securing the plate-like members together, to the end that effective sealing about the periphery of such element is achieved.

An additional object of the invention is to provide an improved device of the character described having novel sealing means formed integrally with one or both of the plate-like members; and which requires only the conventional sealing gasket as a sealing means so as to eliminate the necessity for additional sealing gaskets or washers.

A construction designed to carry out the invention will be hereinafter described together with other features of the invention.

Figure 2:
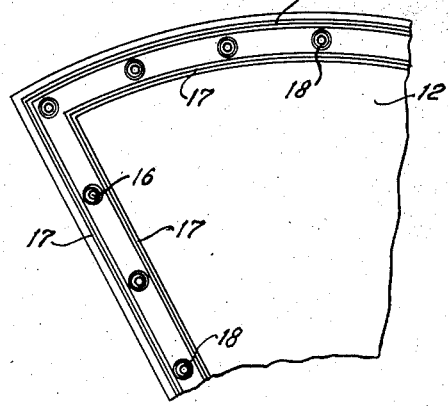
Figure 7:
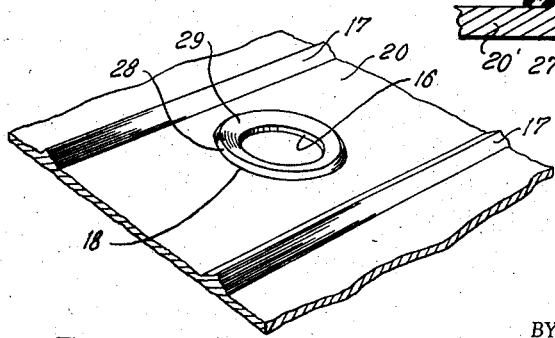
Figure 3:
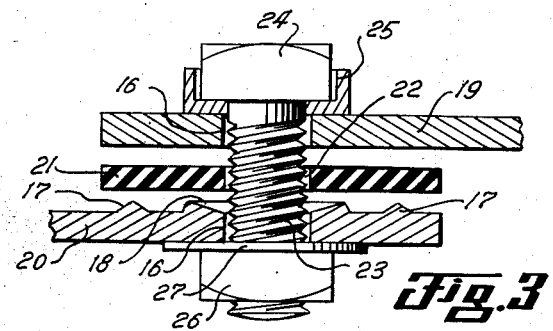
Figure 4:
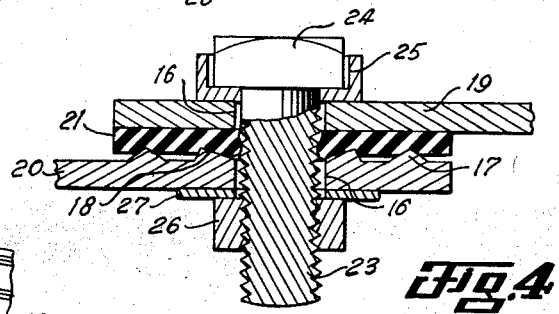
Figure 5:
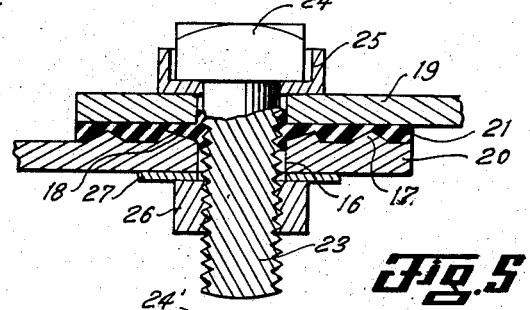
Figure 6:
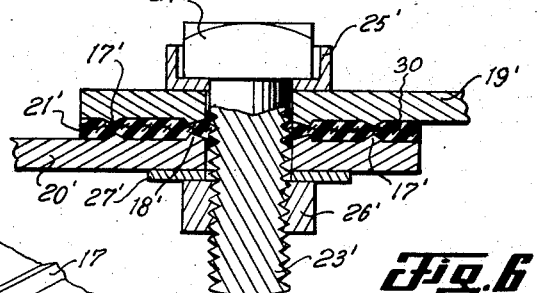

The invention will be more readily understood from a reading of the following specification and by reference to the accompanying drawings, wherein examples of the invention are shown, and wherein:

Fig. 1 is a view in a perspective of a bolted tank constructed in accordance with the teaching of this invention, Fig. 2 is a fragmentary view in elevation taken from the inside of one of the top or deck plate members of the tank, Fig. 3 is an enlarged, cross-sectional view of a bolted joint, showing the same before the bolt is tightened, Fig. 4 is a view similar to Fig. 3 and showing the joint partially tightened, Fig. 5 is a view similar to Fig. 3 and showing the joint entirely tightened, Fig. 6 is a view similar to Fig. 3 and showing a modification of the invention with the joint entirely tightened, Fig. 7 is a fragmentary perspective view showing the sealing means formed about one of the bolt openings, Fig. 8 is a transverse, sectional view of another modification of the invention, Figs. 9, 10, 11 and 12 are sectional, perspective views of further modifications of the invention, and Figs. 13 and 14 are transverse, sectional views of still further modifications of the invention.

In the drawings, the numeral 10 designates a bolted tank which may be formed of any suitable or desirable material and fabricated in any desired fashion. As pointed out hereinbefore, the invention is concerned with the sealing of joints between adjacent plate-like members, and whether such joints occur in storage tanks or in other structures is not material. Further, the substance of which the structure is made is not critical although the invention particularly lends itself to use in structures fabricated of reinforced plastic or synthetic resin sheets.

It is conventional to secure adjacent plates in such structures by means of bolts passing through the overlapping edges of the plates. Here again, however, the fastening means is not critical so long as it is capable of drawing the sheets together as the joint is tightened. Obviously, screw-threaded bolts are normally employed in such a joint and constitute by far the major portion of the fastening means utilized. There are, however, certain types of rivet-like structures which might be employed. To avoid unnecessary repetition, the term "fastened joint" will be employed herein to designate a joint existing between the overlapping edges of two flanges, plates, or other plate-like structures having flat, adjacent, overlapping faces, and having a bolt or other fastening means extending through the overlapping portions of the elements and clamping the same together.

It is conventional in fastened joints to provide a gasket or sealing member between the adjoining and overlapping portions of the plate-like elements, and it is also conventional, when bolts are employed as the fastening elements, to provide some means for holding either the bolt or its nut against turning as the bolt is tightened to make up the joint. This invention employs both of these expedients.

Referring now to the specific embodiment of the invention shown in the drawings, it will be seen that the tank 10 is made up of a plurality of side plates or staves 11, deck plates 12, dome element 13, dome cover 14, manway or access opening cover 15, and other parts joined together by bolts or similar fastening members. The tank also includes bottom plates which are not shown, and may include a drain sump and other members. Because of the variety of the elements and the various types of bolted joints, it is not feasible to describe each element and the manner in which the invention is applied thereto. In each case, however, there is involved a pair of plates, flanges, or plate-like elements having overlapping marginal portions between which a gasket or sealing member is disposed and which are clamped together by a bolt or other fastening means. Since, as will appear more fully hereinafter, the structure of this invention need not be applied to each marginal edge of each element of the tank or other structure, but instead, may be applied only to selected ones of such marginal edges, a portion of one of the deck plates 12 has been illustrated in Fig. 2 and shows the invention applied only to the upper and left-hand edges thereof.

In order to receive the fastening bolts, the elements of the structure are provided with rows of marginal openings 16 adapted to receive the fastening bolts, and normally being slightly larger in diameter than the bolts so that the same may be passed readily therethrough. The elements of the tank or other structure are provided with a pair of raised ridges or ribs 17 extending in parallel fashion along each side of the rows of bolt openings 16. As shown in Figs. 3 through 6, the ridges 17 may desirably be V-shaped in cross-section and have a relatively wide apex angle to avoid any undue tendency to shear or sever the gasket or packing material. There is further provided around each of the bolt holes between the ribs 17 an annular ridge 18 for urging the gasket material into sealing engagement with the bolt or other fastening element.

The details of the structure are shown more clearly in Figs. 3 through 7, Figs. 3 through 5 showing a typical joint in various stages of completion. Referring to these figures, the numeral 19 designates one of the plates or other elements, and the numeral 20 designates the other plate-like element which is to be secured to the plate 19. The elements 19 and 20 are provided with the alined bolt openings 16, and an elongate ribbon-like gasket or sealing element 21 is disposed between the plates. The element 21 is provided with bolt openings 22, desirably of a diameter slightly less than the diameter of the bolt so that the sealing element will have a snug engagement around the bolt. Since the element is formed of rubber, synthetic rubber, or some other suitable resilient and deformable material, it will yield sufficiently to permit the insertion of the bolt in the opening 22.

The bolt 23 extends through all of the openings, and has its head 24 received in a channel 25 which holds the bolt against turning. The usual nut 26 is received upon the opposite end of the bolt, and if desired, a washer 27 may be employed between the nut and the plate 20. It is to be understood that any suitable or desirable type of gasket or sealing element may be employed, but that normally the element 21 extends throughout the length of the bolted joint, and hence, may intersect and seal off a multiplicity of bolts and bolt openings.

The plate 20 is provided with the pair of parallel ribs 17 spaced laterally and on each side of the bolt opening 16, while the annular ridge 18 is disposed between the ribs 17 and surrounds the bolt opening 16. It is to be noted that the annular rib 17 is of beveled construction and has an inclined outer wall 28 which is disposed at a relatively steep angle with respect to the surface of the plate 20, while the inclined inner surface 29 of the ridge 18 is inclined at an angle more nearly approaching the horizontal, or the plane of the surface of the plate 20, and extends at a somewhat smaller angle with respect to said surface than the outer wall 28.

One of the major problems in sealing a bolted joint is to seal the threads of the bolt 23 effectively and prevent the leakage of fluid along said threads. The inner portions of the threads of the bolts 23 often receive some seepage from the interior of the tank or other structure in which the joint is used, and this seeping fluid will sometimes course along the grooves of the bolt threads, spiraling around the bolts in a helix, and create leaks from the tank or other vessel. The present invention effectively prevents such leaks by sealing the threads of the bolt, and this desirable result is achieved through the action of the annular ridge 18 which forces the material of the gasket 21 into the threads of the bolt.

It is known that rubber and rubber-like materials will deform under pressure and will cold flow when a force is exerted in the proper directions to make the material flow. As the joint illustrated in Fig. 3 is tightened, as illustrated in Fig. 4, the ribs 17 bear against the gasket 21, distorting the same and commencing an effective seal between the plates 19 and 20, and also isolating the bolt holes from the lateral edges of the plates. When the joint is completely made up, as illustrated in Fig. 5, the ribs 17 engage the gasket securely and distort the same sufficiently to provide a very efficient and complete seal between the plates 19 and 20. At the same time, the engagement of the ribs 17 with the gasket or sealing member anchors the member against displacement and not only holds the gasket in its proper position between the overlapping portions of the plates 19 and 20, but prevents the central portion of the gasket from tending to shift laterally so as to enlarge or elongate the bolt openings 22 and render difficult the sealing of the shanks of the bolts 23. In cooperation with this action, the annular rib 18 engages the gasket as tightening of the joint is commenced, as shown in Fig. 4, the apex of the rib 18 bearing into the body of the gasket material and anchoring in position that portion of the gasket material immediately surrounding the bolt opening 22. Because of the wedge-like, beveled inner surface 29 of the ridge 18, further tightening of the joint causes the portion of the gasket immediately surrounding the bolt 23 to be distorted and flowed radially inwardly toward the shank of the bolt and forced into snug sealing engagement with the threads of said bolt. Thus, the apexes of the ribs 17 and the ridge 18 initially engage and anchor the gasket material, and then the inclined, wedge-like inner surface 29 of the ridge 18 functions to distort the gasket and drive it inwardly against the threads of the bolt. This action not only effectively seals the threads of the bolt, but also causes the gasket material to flow upwardly and downwardly into the bolt openings 16 whereby a tight and secure joint is obtained.

It is quite apparent that the ribs 17 may be formed on one of the plate members and the ridge 18 formed on the other of said members, but it has been found more convenient and practical to form both of these raised elements upon one of the plate surfaces.

On the other hand, it is quite feasible to provide the ribs 17 and the ridges 18 upon both of the plate elements, as illustrated in Fig. 6, the parts in this modification having been given the same numerals in the drawings as employed in Figs. 3 through 5 with the exception that each of the numerals is primed. In order to prevent damage and possible shearing of the gasket material, it is normally desirable that the ribs 17' and ridges 18' of the form of the invention shown in Fig. 6 project a somewhat lesser distance from the surface of the plates 19' and 20', but this matter of dimension is determined principally by the thickness of the gasket element 21'. While not limited to the modification shown in Fig. 6, the gasket member may be a simple homogenous body of any suitable rubber-like material, or it may carry internal reinforcing, as shown at 30 in the gasket 21'.

Returning now to Fig. 2, it will be seen that only one of the plates in each of the joints need be provided with the ribs 17 and ridges 18. Hence, only two of the lateral edges of the deck section shown in Fig. 2 are illustrated as being provided with the sealing structure since the other edges thereof will join in cooperation with the edges of other sections which are provided with the sealing arrangement.

The relative angles defined by the outer and inner surfaces 28 and 29 of the ridges 18 with respect to the surface of the plate carrying the ridges are not extremely critical. There are, however, certain desirable limits for these angles that should be observed when this form of the invention is employed. The outer surface should be at an angle greater than 30° and preferably from 35°–45°. The inner surface should lie at an angle less than 30° and desirably from 15–25°. The inner surface should be of sufficiently gentle slope as to insure its wedge-like or cam-like action in forcing a sufficient portion of the gasket material toward the fastening member, and yet must not be so nearly parallel to the surface of the plate member as to lose this function. The slope of the outer surface of the ridge 18 must not be so steep as to tend to shear or sever the gasket at the apex of the ridge, nor so flat as to cause excessive tensile stresses in the gasket at the apex of the ridge. Hence, it will be seen that the respective angles of the inner and outer surfaces are not merely arbitrary, but are chosen for good and adequate reasons.

Various modifications of the invention are shown in Figs. 8 through 14, being concerned primarily with the cross-sectional shape of the inner annular ridge 18, and with the means for situating the ridge around the bolt openings.

As shown in Fig. 8, the inner and outer faces 31 and 32, respectively, of the annular ridge 33 may be disposed at substantially equal angles, their apex may be relatively sharp, and the ridge may be formed integrally with the plate or other element 34 forming one member of the fastened joint. Or, as shown in Fig. 9, the plate 35 may have integral rectilinear ribs 36 and the integral annular ridge 37, both the ribs and the ridge having equi-angular inner and outer faces and having rounded apices 38. The rounded apex structure may be applied to the first-described form of the invention, as illustrated in Fig. 10 by the ribs 39 and ridge 40.

It may not always be desirable to form the ribs and/or the annular ridge integrally with the plate or flange. In Fig. 11, the plate 41 is provided with a pair of parallel grooves 42 receiving elongate rib members 43 presenting inverted V or wedge-shaped upper surfaces 44 which extend above the surface of the plate 41 for engaging a packing or sealing gasket. There is also a circular groove or recess 45 around the bolt opening 46 in the plate, and an annular ring or ridge member 47 seats in the recess. The outer peripheral wall of the ring may be relieved or inclined, as shown at 48, while the cross-section of the upper or protruding portion 49 of the ring is similar to that of the rib members 43.

In the form shown in Fig. 12, the apices or gasket-engaging edges 50 of the rib member 43' are rounded, while the recess 45' is made shallower and slightly larger than the ring member 47'. The ring or ridge member 47' has unequal inner and outer upper faces, 51 and 52, respectively, similar to the form shown in Figs. 3 and 10.

The invention is also applicable to metallic or steel structures, as well as the more readily formed materials such as resins, and forms of the invention particularly adapted for metallic construction are shown in Figs. 13 and 14. In these modifications, the plate or flange member 53 is provided with a bolt or fastener-receiving opening 54, and a gasket-deforming washer is received upon the plate surrounding the opening. Both forms of the washer are annuli having a circular crimp or bend to give an inverted, approximately V-shaped, radial cross-section to the washers. In Fig. 13, the upper faces of the washer 55 are disposed on unequal angles, the inner upper face 56 being more nearly parallel to the plate 53 than the outer upper face 57. In Fig. 14, the inner and outer upper faces 58 and 59 of the washer 60 are formed at equal angles.

The various modifications of the invention function in substantially the same manner as the first-described form and provide rectilinear as well as annular seals, and further, seal off in the bolt opening effectively. It is pointed out, however, that the forms of the invention shown in Figs. 3 and 10 have been found to be the most efficacious from the view points of convenience, reliability, and excellence of seal obtained.

Although the invention is adaptable to plate-like elements formed of any suitable or desirable material, it finds its greatest applicability in structures fabricated from plates formed of plastic or synthetic resin, or other readily moldable or formable material.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A fabricated structure in which a thin rigid plate-like element is joined to another thin rigid plate-like element by a bolted joint, having therein a deformable sealing gasket engaging adjacent faces of the two elements and through which joint securing bolts extend, comprising, the two elements with each element having a row of bolt openings along one of its margins receiving tightened bolts, a circular ridge on one surface of one of the elements around each of the bolt openings along its margin, each ridge being approximately V-shaped in cross section and having inclined inner and outer surfaces deforming the sealing gasket into sealing engagement with the tightened bolt received in the bolt opening surrounded by the ridge, and a longitudinal V-shaped rib along each side of the row of bolt openings, the ribs being spaced laterally from the openings and the circular ridges deforming the gasket and sealing the joint between the adjacent faces of the two elements simultaneously with the deforming of the gasket which seals the tightened bolt.

2. A structure as set forth in claim 1 wherein the ridges and ribs of the one element have rounded apices.

3. The sealing structure comprising, overlapping thin rigid plate-like elements, a deformable sealing gasket therebetween, a fastening member extending through the sealing gasket and the overlapping portions of the plate-like elements, a ridge formed on one of the plate-like elements around the fastening member and abutting the sealing gasket, said ridge projecting from the element and having bevelled inner and outer surfaces meeting in an apex, the outer surface being disposed at a greater angle with respect to the surface of the plate-like element than the inner surface whereby the inner surface forms a wedge structure which forces the material of the sealing gasket toward the fastening member and deforms the sealing gasket into sealing engagement with the tightened fastening member securing the overlapping portions of the plate-like elements together, and V-shaped ribs projecting from the surface of one of the plate-like elements and abutting the sealing gasket, one rib being spaced laterally from and disposed on each side of the fastening member, the ribs extending longitudinally of the overlapping portions of the plate-like elements which deforms the gasket and seals the space between the overlapping portions of the plate-like elements while the sealing gasket is deformed and seals the tightened fastening member securing the overlapping portions of the plate-like elements together.

4. A sealing structure as set forth in claim 3 wherein the element carrying the ridge has an opening therethrough in which the fastening member is positioned, and the inner surface of the ridge intersects the wall of said opening.

5. A sealing structure as set forth in claim 4, wherein the ridge is annular, surrounds the fastening member, and has an annular apex.

6. A sealing structure as set forth in claim 5, wherein both the plate-like elements carry the ridge on their surfaces engaging the sealing gasket.

7. A sealing structure as set forth in claim 5, wherein both of the plate-like elements carry the ridge and the ribs on their surfaces engaging the sealing gasket.

8. A fabricated structure comprising, a first thin rigid plate-like element, a second thin rigid plate-like element, a sealing gasket engaging adjacent faces of the first and second elements, tightened bolts extending through openings in each element and securing the adjacent faces of the elements together, a circular ridge on one element face around each bolt opening, each ridge being approximately V-shaped in cross-section and having inclined inner and outer surfaces with respect to the bolt opening, the outer surface of the ridge intersecting the surface of the element at an angle greater than that at which the inner surface of the ridge intersects the surface of the element and deforming the sealing gasket into sealing engagement with the bolt, and a longitudinal V-shaped rib on the element face along each side of the row of bolt openings, the ribs being parallel and spaced laterally from the openings and their circular ridges and deforming the sealing gasket and sealing the space between the plate-like elements.

References Cited in the file of this patent

UNITED STATES PATENTS

| | | |
|---|---|---|
| 1,986,980 | Ross | Jan. 8, 1935 |
| 2,132,796 | Money | Oct. 11, 1938 |
| 2,207,897 | Schaus | July 16, 1940 |
| 2,343,235 | Bashark | Feb. 29, 1944 |